United States Patent [19]

Russell

[11] Patent Number: 4,959,110
[45] Date of Patent: Sep. 25, 1990

[54] METHOD FOR LINING THE INNER SURFACE OF A CYLINDRICAL OR DOMED CYLINDRICAL MEMBER WITH AN ELASTOMERIC MATERIAL

[75] Inventor: Peter G. Russell, Ogden, Utah
[73] Assignee: Morton Thiokol Inc., Chicago, Ill.
[21] Appl. No.: 193,309
[22] Filed: May 11, 1988
[51] Int. Cl.⁵ .................. B29C 53/58; B29C 63/08
[52] U.S. Cl. ................... 156/187; 156/195; 156/391; 156/428; 118/105; 118/215; 118/254; 118/306; 118/318; 118/DIG. 10
[58] Field of Search .............. 156/74, 187, 195, 287, 156/294, 391, 392, 425, 428, 244.13; 493/293, 294; 118/55, 105, 214, 215, 254, 306, 318, DIG. 10; 427/231; 264/267, 269, 270, 310, 311

[56] References Cited

U.S. PATENT DOCUMENTS

| | | | |
|---|---|---|---|
| Re. 27,061 | 2/1971 | Rubenstein | 156/294 X |
| 2,133,013 | 10/1938 | Boylan et al. | 118/306 |
| 2,133,015 | 10/1938 | Boylan et al. | 118/DIG. 10 |
| 2,516,242 | 7/1950 | Munger | 156/391 X |
| 3,108,023 | 3/1961 | Griesmer et al. | 118/254 |
| 3,126,306 | 3/1964 | Sherman | 156/392 X |
| 4,150,176 | 4/1979 | Beckers | 264/310 |
| 4,415,390 | 11/1983 | Smith | 156/391 X |
| 4,507,165 | 3/1985 | Herring | 156/191 |
| 4,514,443 | 4/1985 | Kostecki | 118/254 |
| 4,596,619 | 6/1986 | Marks | 156/171 |
| 4,664,741 | 5/1987 | Fechner et al. | 156/391 X |

FOREIGN PATENT DOCUMENTS

| | | | |
|---|---|---|---|
| 39-22359 | 10/1964 | Japan | 118/318 |
| 0975105 | 11/1982 | U.S.S.R. | 118/318 |

*Primary Examiner*—David Simmons
*Assistant Examiner*—Steven D. Maki
*Attorney, Agent, or Firm*—Gerald K. White

[57] ABSTRACT

A method for lining the inner surface of a generally cylindrical member or domed cylindrical member with an elastomeric material. A let-off head is provided within the member for applying a continuous strip of tacky elastomeric material to the inner surface thereof as it rotates. The head is moved axially as the strip is applied to form a layer of elastomeric material over the inner surface. After the head is removed, the applied elastomer material is cured.

8 Claims, 3 Drawing Sheets

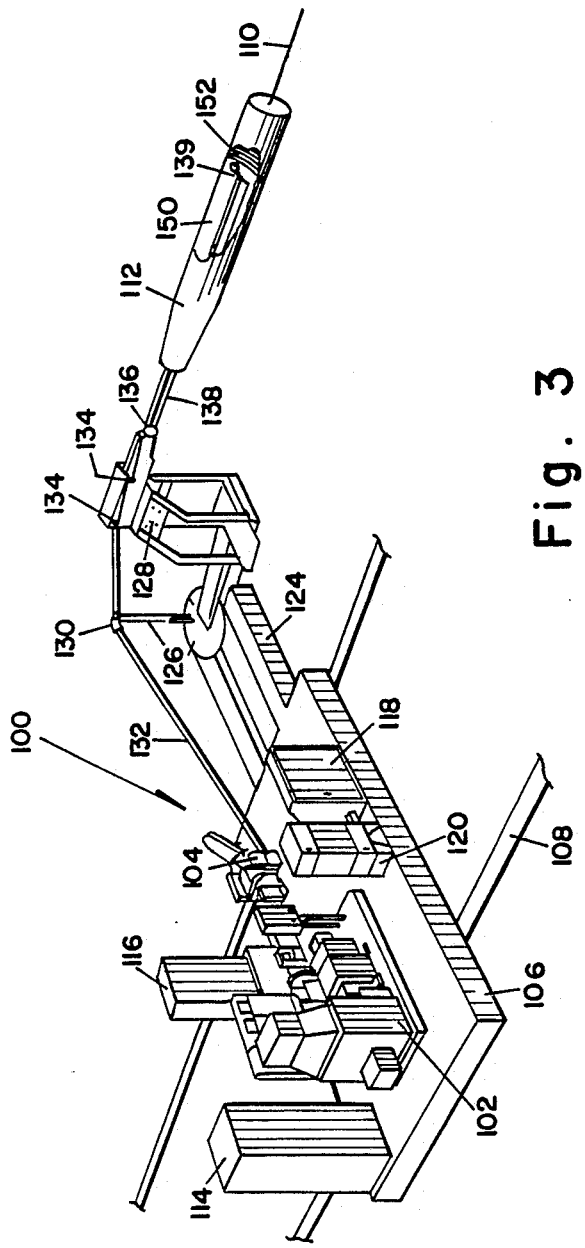
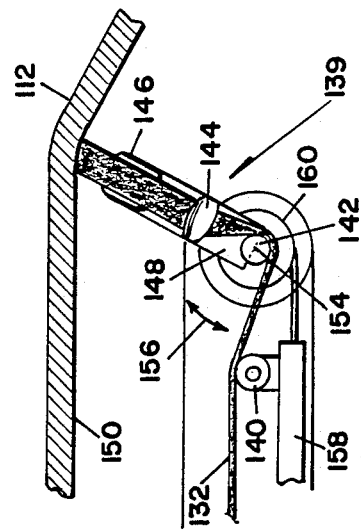
Fig. 3
Fig. 5

METHOD FOR LINING THE INNER SURFACE OF A CYLINDRICAL OR DOMED CYLINDRICAL MEMBER WITH AN ELASTOMERIC MATERIAL

The United States Government has rights in this invention pursuant to Contract No. F04701-70-0182 awarded to Morton Thiokol, Inc. by the United States Air Force.

The present invention relates generally to the lining of the inner surfaces of generally cylindrical members including members having domed shapes or the like with an elastomeric material. More particularly, the present invention relates to the application of a continuous strip of tacky elastomeric material to the inner surface of a generally cylindrical member as it rotates in order to line the inner surface thereof. The method has various applications among which is inside strip wrapping of solid propellant rocket motor insulators.

In the construction of rocket motors, an objective is to minimize the weight of inert parts so that the payload and range of the rocket can be maximized. In accordance with this objective, the rocket case is desirably made as thin as possible without compromising its function as a pressure vessel and as a structural member. The case is commonly protected from the burning propellant by an elastomeric insulation that is also desirably made as thin as possible and with minimum weight without compromising its function. It is considered necessary that this elastomeric coating be free of voids, generally uniform in thickness or tapered thickness, and free of separations from the rocket case.

The use of a hand layup procedure for installing the insulation in the case is not only cumbersome but also labor intensive and therefore expensive and may not achieve the uniformity that may be desired to be free of voids and separations.

U.S. Pat. No. 4,596,619 to Marks discloses a process and apparatus for lining composite vessels. The method is disclosed as comprising causing a thin, tacky ribbon comprising an elastomer (preferably curable) to continuously so encircle a center rotational axis of a mandrel as to adjacently position and tack together integral segments of the ribbon substantially circumferentially relative to the center rotational axis thereby forming a layer of the elastomer about the mandrel. A shell comprising filaments and thermosettable resin is applied to the layer of elastomer after which the resin is cured to provide the vessel or portion of a vessel. The patent to Marks also discloses apparatus for performing this method. The apparatus is disclosed to be an adaptation of the model 601 Orbitread ® New Tire System which is commercially available from AMF Corporation (now Tire Equipment Inc.) of Santa Ana, Calif. 92704. While such equipment as disclosed in Marks may be used for winding exteriorly about a mandrel and then forming a composite vessel about the resulting insulator, the equipment, as disclosed therein and unmodified, cannot suitably be used for lining the inner surface of a long cylindrical member which has already been formed. Thus, the equipment, as disclosed in Marks and unmodified, is not suitably workable for lining long steel rocket motor cases, which must be lined after they are formed.

It is, therefore, an object of the present invention to provide an inexpensive process for lining the inner surface of a generally cylindrical member with an elastomeric material.

It is another object of the present invention to provide an inexpensive process for inside strip wrapping of rocket motor insulators.

It is yet another object of the present invention to provide such a process wherein the lining is free of voids, uniform in thickness or tapered thickness, and free of separations from the rocket case.

The above and other objects as well as features and advantages of this invention will be apparent in the following detailed description of the preferred embodiments thereof which is to be read in connection with the accompanying drawings.

BRIEF DESCRIPTION OF THE DRAWINGS

In the drawings:

FIG. 3 is a view similar to that of FIG. 1 which illustrates another alternative embodiment of the apparatus of the present invention;

FIG. 5 is a top detail view of the let-off head of the apparatus of FIG. 3.

DETAILED DESCRIPTION OF THE PREFERRED EMBODIMENTS

Figure 1:
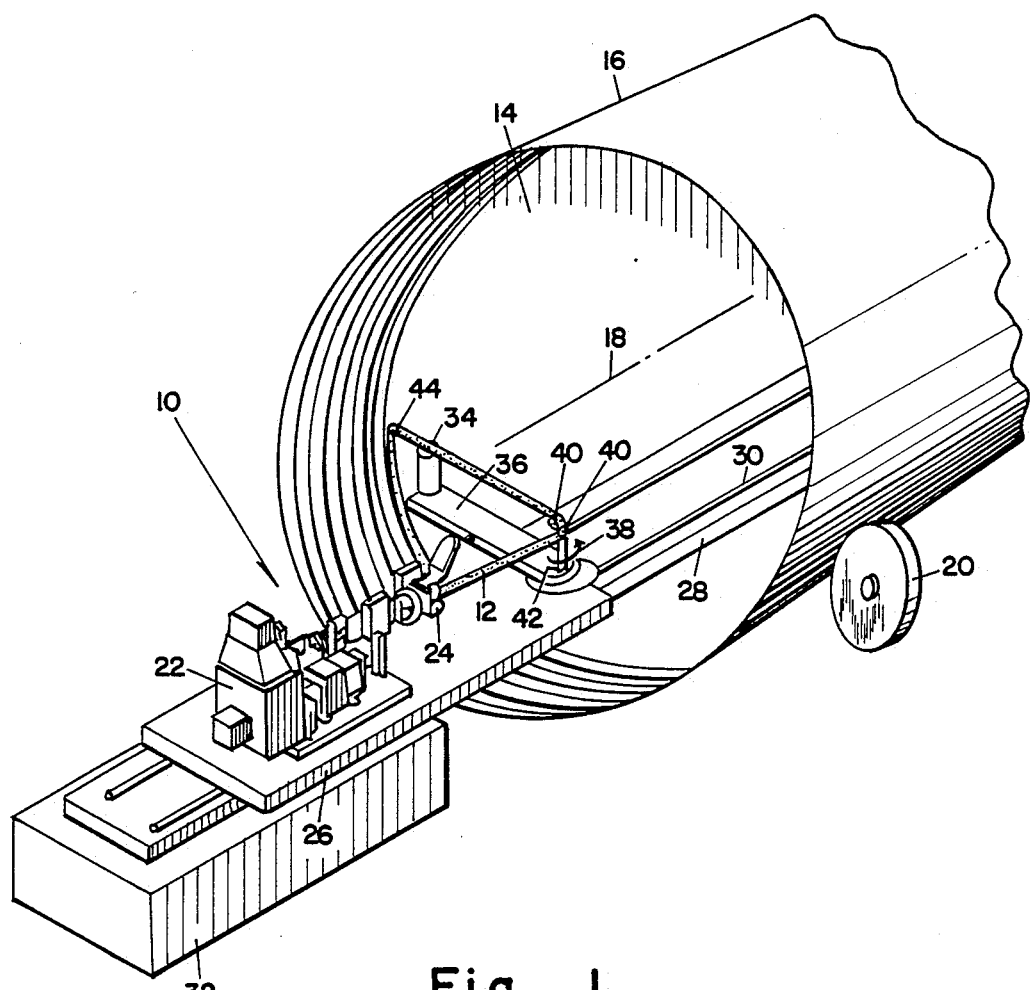
FIG. 1 is a schematic perspective view of apparatus which embodies the present invention.

Referring to FIG. 1, there is shown generally at 10 apparatus for forming and shaping a thin tacky ribbon 12 of elastomeric material for lining the inner surface 14 of a generally cylindrical member such as a generally cylindrical rocket motor case, illustrated at 16, as it is rotated about its rotational axis, illustrated at 18, by case rotator means such as roller 20 suitably powered by an electric motor (not shown) or the like. Apparatus 10 may, for example, be a modified Tire Equipment Inc. (formerly AMF) Model 608 Strip Wrapper similar to that shown in the aforesaid U.S. Pat. No. 4,596,619 to Marks, which patent is hereby incorporated herein by reference, in FIG. 1 thereof.

The thin tacky strip 12, which is continuous, is extruded from extruder 22 which receives a supply stock therefor. The extruded continuous strip is passed through forming die 24, which may be called a roll-former, for forming thereof into the desired shape.

Apparatus 10 is mounted on a carriage 26 which is movable axially of the case 16 along platform 28 by any suitable means such as rails or by grooves 30 in which rollers (not shown) are guided. The platform 28 extends through and over the length of the case 16 and beyond each end of the case and is supported at each end so as to be elevated and thereby not interefere with the rotation of the case 16. At one end, it is supported by support member 32. At the other end (not shown) which may be dome shaped, it may be supported by a movable pylon. The other end of the platform 28 has retractable wheels (not shown) to allow relative movement between the platform 28 and case 16 to permit insertion of the platform 28 therethrough and removal therefrom. Insertion and removal may be performed by holding the platform 28 stationary and moving the case 16 axially.

A strip let-off head 34 is positionable adjacent the inner surface 14 of the case by means of radially extending member 36 to which the head 34 is attached at one end and the other end of which is rotatably mounted on the platform for rotation, as illustrated at 38, about a vertical axis for application of the strip at an angle to the radial direction so that the strip 12 may be wrapped onto domed end surfaces or other surfaces which are not cylindrical in shape.

The strip 12 of thin elastomeric material is routed from the forming die 24 in a direction axially of the case 16 to rotatable center post 42 on member 36 whereat the strip 12 is caused to change direction by rollers 40 on the center post 42 for routing in a radial direction of the case 16 to the let-off head 34 for application thereof to the inner surface 14 of the case 16. The adherence of the tacky strip 12 to the case 16 as it is rotating continuously effects pulling of the strip 12 to the let-off head 34 and application to the case inner surface 14 as it is extruded and formed.

The let-off head 34 includes a pay-off wheel 44 which is preferably motorized to turn at a surface speed greater than the surface speed at which the case 16 is turned so that a slight compressive stress is created in the applied insulation strip 12 in order to eliminate air pockets and insure conformity of the insulation to the case surface 14.

As the strip 12 of insulation material is applied, the carriage 26 is caused to move axially of the case 16 under microprocessor control to continuously reposition the let-off head 34 so that each successive rotation of strip 12 overlaps the prior rotation to overlappingly position and tack together successive integral segments of the strip 12 in a shingle effect so that an uninterrupted layer of insulation is formed over the inner surface 14 of the case 16.

It may be advantageous to apply a tackifier to the inner surface 14 of the case before applying the insulation. A typical suitable tackifier may be, for example, a solution of the insulation polymer in methyl chloroform, the latter evaporating before the insulation is cured.

The insulation material (ablative insulation) may be, for example, uncured nitrile (NBR) rubber or ethylene propylene diene monomer (EPM). However, the present invention is not limited to the use of any particular insulation material. For domed sections of large cases, strip widths of 4 to 6 inches are considered optimal. Smaller motors may require narrower strips.

After the uncured insulation is applied, apparatus 10 is removed therefrom and the applied insulation is cured in accordance with principles commonly known to those of ordinary skill in the art to which this invention pertains after which the case is loaded with propellant material by conventional procedures commonly known to those of ordinary skill in the art to which this invention pertains.

Various control devices (not shown) for the apparatus 10 may be located off of the carriage 26 and appropriately wired thereto through an umbilical cord (not shown) since a minimum amount of space may be available on the carriage 26. Similar control devices are discussed hereinafter with reference to FIG. 2.

Figure 2:
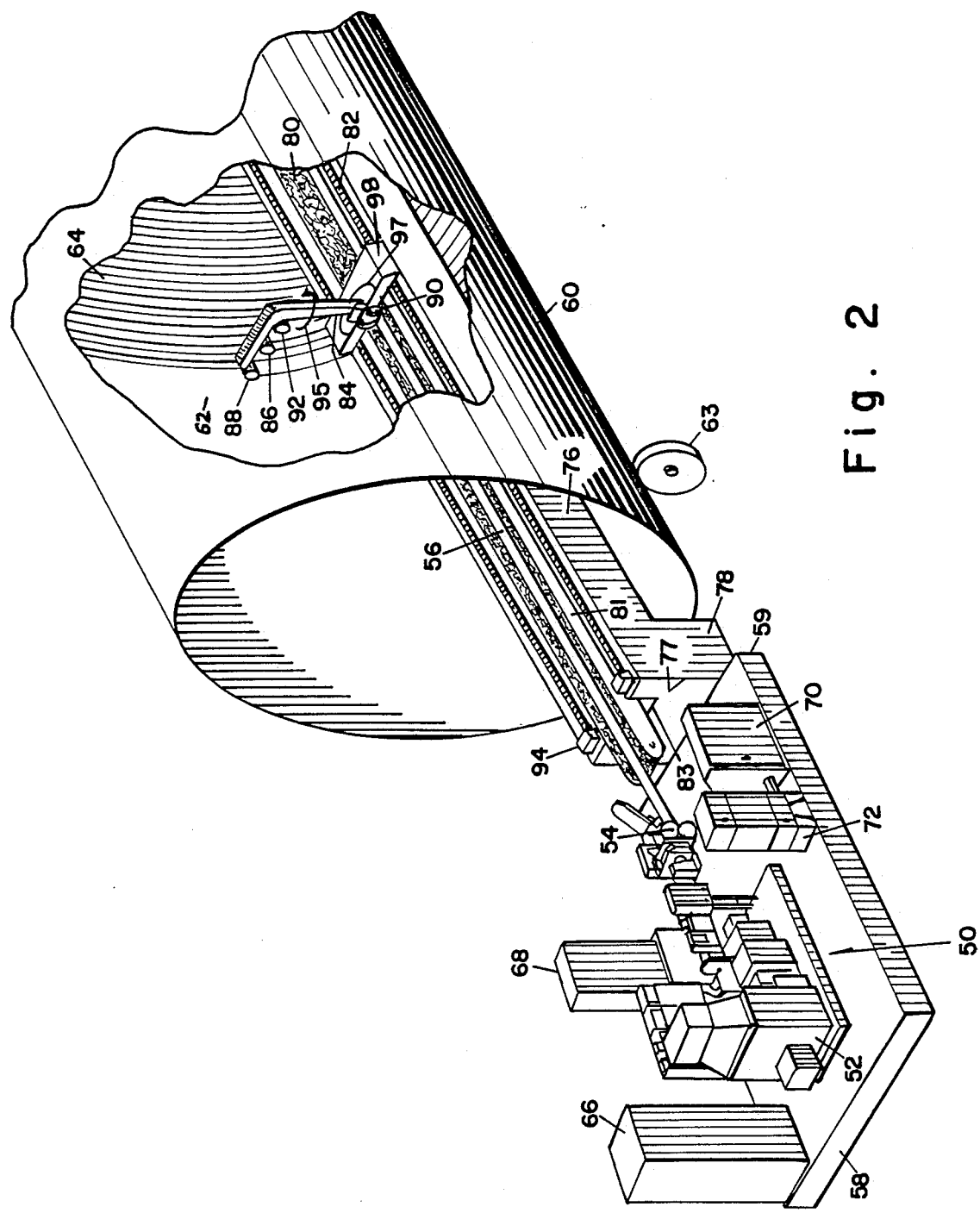
FIG. 2 is a view similar to that of FIG. 1 which illustrates an alternative embodiment of the apparatus of the present invention.

FIG. 2 illustrates an alternative apparatus and method according to the present invention. Apparatus generally illustrated at 50 includes an extruder 52 and forming die 54, similar to the extruder 22 and forming die 24 of FIG. 1, for supplying a thin tacky continuous elastomeric strip 56. The extruder 52 and forming die 54 are located on a non-movable support 58 which is positioned to be located just outside of one end of a rocket motor case 60 for supplying the strip 56 for strip winding the extruded and formed elastomeric material on the inner surface 62 thereof as the case is rotated by a suitable case rotator illustrated at 63, similar to case rotator 20 of FIG. 1, for forming an insulator thereon. The insulator is shown partly formed at 64. Included on the support 58 are various conventionally known controls for the apparatus 50 including an extruder drive cabinet 66, a temperature control unit 68, a system control cabinet with spin sync 70, and microprocessor 72.

Similar controls to controls 66, 68, 70, and 72 are provided for the apparatus 10 of FIG. 1, but they are provided off of the carriage 26 in order to minimize the weight and volume of equipment which must be transported into a case on carriage 26. Thus, these controls are not shown in FIG. 1.

A platform illustrated at 76 extends axially of the case 60 through and over the length of the case and beyond both ends thereof and is elevated so that it does not come into contact with and thereby interfere with the rotation of the case during strip winding thereof. One end 77 of the platform 76 is elevated on support portion 78. The platform 76 is cantilevered for purposes of inserting the case, but during strip winding, its other end (not shown) is supported by a pylon. The end 77 of the platform 76 on support portion 78 is located adjacent and may be connected to the side 59 of the platform support 58 from which the thin tacky strip 56 is released to thereby receive the thin tacky strip 56 on endless conveyor belt 80 driven by any suitable conventional means and which is contained on the platform 76 and extends over the length thereof and encircles a suitable support 81 in a longitudinal groove 83 in platform 76. Alternately, the strip 56 may be conveyed by other suitable means such as rollers. The platform 76 also includes a pair of transport tracks 82 such as cables which are adjacent and alongside both sides respectively of the conveyor belt 80 and which extend over the length of the platform 76. A carriage or transport 84 for applying the strip 56 to the case surface 62 is fixed to the tracks 82. Alternatively, the transport 84 may have motorized wheels for transport along rails. A suitable drive means illustrated at 94 effects movement of each track 82 for movement of transport 84 axially of the case 60. The transport or applicator means 84 is provided to support a let-off head 88 adjacent the inner surface 62 of case 60 for letting off or applying the continuous strip 56 thereto similarly as discussed with respect to FIG. 1. The transport member 84 is movable axially of the case 60 on the transport tracks 82. It includes roller 90 for receiving the strip 56 from the conveyor belt 80 and roller 92 for receiving the strip 56 after it has been turned 90° for passage via roller 86 to the let-off head roller 88. Thus, the continuous strip of tacky elastomer is delivered from the forming die 54 onto the conveyor belt 80 and conveyed thereon to roller 90, then turned 90° and routed to roller 92 and then via roller 86 to the let-off head 88 for application to the inner surface 62 of the case 60.

The transport 84 is rotatable, as illustrated at 95, by means of a suitable motorized member 97 rotatable relative to transport member 98. Member 97 rotatably supports transport 84. The support member 98 is movable axially along tracks 82 for support of member 97 for movement of transport 84 axially of the case 60. The microprocessor 72 is programmed, using principles commonly known to those of ordinary skill in the art to which this invention pertains, for controlling speed of extrusion, rate of rotation of the case 60, speed of the transport or carriage 84 along the platform 76, and the rotational movement of rotatable member 97 for application to spherical, semi-spherical, and conical domed heads as well as cylindrical sections.

Figure 4:
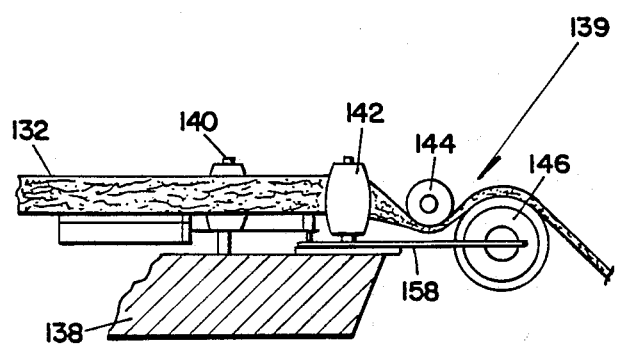
FIG. 4 is a side detail view of the let-off head of the apparatus of FIG. 3.

FIGS. 3 to 5 illustrate another apparatus and method of the present invention. Generally shown at 100 is extruded and forming apparatus including extruder 102 and forming die 104 similar to the extruder 22 and 52 and forming die 24 and 54 of FIGS. 1 and 2 respectively. Apparatus 100 is contained on platform 106 which is movable along suitable means such as tracks or rails 108 by suitable conventional means (not shown) in a direction parallel to the rotational axis 110 of rocket motor case 112. Also contained on the platform 106 are a drive cabinet 114 for the extruder, a temperature control unit 116, a system control cabinet with spin sync 118, and a microprocessor 120 which are similar respectively to the drive cabinet 66, temperature control unit 68, the system control cabinet with spin sync 70, and the microprocessor 72 of FIG. 2.

Cantileverly supported from the platform 106 is a support structure 124 for post 126 and for a control panel 128. The formed and extruded strip 132 leaving the forming die 104 is directed to a roller 130 at the top of the post 126 in generally a radial direction relative to the case axis 110. The strip 132 is guided by the roller 130 to change direction so that it passes by rollers 134 at the control panel 128 in an axial direction relative to the case 112. The strip 132 is then let off from a let-off roller 136 onto an extension member 138 which is cantileverly supported from the control panel 128 to extend axially into the case 112 to position a let-off head 139, having a roller or applicator 146 suitably mounted on radially extending elongate support member 148, adjacent the inner surface 150 thereof. The strip 132 is carried along the extension member 138 to a first guide roller 140 in an axial direction then to a second guide roller 142 which effects a change of direction of the strip 132 so that it passes in a radial direction of the case 112 via a third guide roller 144 to the let-off roller 146 for application of the tacky continuous strip 132 to the inner surface 150 of the case 112 to form a layer of insulation, illustrated at 152, thereon.

The let-off head member 148 is suitably rotatable, as illustrated at 156, about its radially inner end portion, i.e., about the point illustrated at 154, by head rotation ram 158 or other suitable rotatable means effecting rotation of rotatable member 160 to which let-off head member 148 is suitably fixedly attached in order to appropriately orient let-off roller 146 to the case contour, as best shown in FIG. 5.

The platform 106 is movable axially along the tracks 108 in order to effect movement of the cantileverly positioned let-off head 146 axially relative to the case surface 150 in order to form the layer 152 of elastomeric material insulator over the inner surface 150 similarly as discussed with respect to FIG. 1.

While in all three embodiments of the present invention, the continuous tacky strip has been shown and described to be extruded, it is to be understood that any other suitable method for forming the strip is meant to come within the scope of the present invention. For example, the strip may be calendared in which case, for cylindrical sections, insulation strips as wide as three feet or more may be rapidly applied.

The following examples illustrate aspects of this invention in a more specific manner. The practices illustrated in the examples are not meant to limit this invention, but are meant instead to provide greater detail in a particular application.

EXAMPLE 1

The following describes the application of a layer of elastomer to the inner surface of a steel cylinder 120 inches in diameter and 30 inches long. Premilled uncured elastomeric stock formed into a suitable physical dimension was fed to a 3½ inch diameter extruder. The extrudate was passed through a die unit and formed into a thin ribbon of about 1½ inches wide by 0.07 inch thick. The rubber ribbon was applied to the inside surface of the rotating cylinder using the previously discussed Model 608 strip wrapper of Tire Equipment, Inc. which was modified to position its head to apply the ribbon to the inner surface of the relatively short cylinder. The linear speed of the ribbon was matched to the linear speed of the cylinder at the point of application. Applied thickness at any point was controlled by varying such parameters as ribbon spacing (turns/inch), ribbon tension, ribbon thickness, and rate of linear speed of the cylinder at the point of application to the linear speed of the ribbon at exit from the die system. This successfully demonstrated that the inside cylindrical portion of a rocket motor case could be insulated with a strip wrapping machine using a process according to the present invention.

EXAMPLE 2

A second test was made using an elliptical dome 11 feet in diameter. Premilled uncured elastomeric stock was fed into a 3½ inch extruder. The extrudate was passed through a die unit and formed into a thin ribbon 1½ inches wide by 0.070 inch thick. The elastomeric ribbon was applied to the inside surface of the rotating dome using apparatus similarly as described for Example 1. The linear speed of the rubber ribbon was matched to the linear speed of the rotating cylinder at the point of application. The applied thickness at any point was controlled by varying such parameters as ribbon spacing (rotating/inch), ribbon tension, ribbon thickness, rate of linear speed of the dome at the point of application to the linear speed of the ribbon at exit from the die system. This successfully demonstrated that the inside of the dome of a rocket motor case could be insulated with a strip wrapping machine using a process according to the present invention.

Thus, in order to inexpensively line the inner surfaces of rocket motor cases and other generally cylindrical members with a lining which is uniform in thickness and free of separations and voids in accordance with the process of the present invention, a continuous strip of tacky elastomeric material is transported into the case to a head where the strip is applied to the inner surface as the case is rotated. The head is moved axially as the strip is applied to shingle the windings and thus form a layer of the elastomeric material on the inner surface. The head may be rotated about a vertical axis for application of the strip to domed surfaces. Applied thickness may be controlled, using principles commonly known to those of ordinary skill in the art to which this invention pertains, by varying such parameters as ribbon spacing (turns/inch), ribbon tension, ribbon thickness, and rate of linear speed of the cylindrical member at the point of application to the linear speed of the ribbon at exit from the die system. After the layer has been applied, the head is removed, and the elastomeric material cured. If the generally cylindrical member is a rocket motor case, it is then loaded with propellant material. For small cylindrical members, the head is cantileverly positioned therein as shown in FIGS. 3 to 5.

It is to be understood that the invention is by no means limited to the specific embodiments which have been illustrated and described herein, and that various modifications thereof may indeed be made which come within the scope of the present invention as defined by the appended claims.

What is claimed is:

1. A method for lining the inner surface of a generally cylindrical member with an elastomeric material comprises the steps of:
   a. rotating the generally cylindrical member about its rotational axis;
   b. providing within the generally cylindrical member a head for applying a continuous strip of tacky elastomeric material to the inner surface of the generally cylindrical member as it rotates;
   c. transporting a continuous strip of tacky elastomeric material to the head for application to the inner surface of the generally cylindrical member as it rotates;
   d. applying the strip of tacky elastomeric material to the inner surface of the generally cylindrical member as it rotates;
   e. moving the head axially as the strip is applied to form a layer of elastomeric material over the inner surface of the generally cylindrical member;
   f. removing the head from within the generally cylindrical member; and
   g. curing the applied elastomeric material,
   the method further comprises providing an elevated platform which extends axially through the generally cylindrical member, providing a support member for the head, moving the support member axially along said platform, and conveying the elastomeric strip to said head from outside the generally cylindrical member.

2. A method according to claim 1 further comprises cantileverly supporting the head within the generally cylindrical member.

3. A method according to claim 1 further comprises rotating the head support member about a vertical axis to position the head for applying the elastomeric strip to a domed portion of the generally cylindrical member.

4. A method for lining the inner surface of a generally cylindrical member with an elastomeric material comprises the steps of:
   a. rotating the generally cylindrical member about its rotational axis;
   b. providing within the generally cylindrical member a head for applying a continuous strip of tacky elastomeric material to the inner surface of the generally cylindrical member as it rotates;
   c. transporting a continuous strip of tacky elastomeric material to the head for application to the inner surface of the generally cylindrical member as it rotates;
   d. applying the strip of tacky elastomeric material to the inner surface of the generally cylindrical member as it rotates;
   e. moving the head axially as the strip is applied to form a layer of elastomeric material over the inner surface of the generally cylindrical member;
   f. removing the head from within the generally cylindrical member; and
   g. curing the applied elastomeric material,
   the method further comprises providing an elevated platform which extends axially through the generally cylindrical member, providing a support member for the head, moving the support member axially along said platform, conveying the elastomeric strip to said head from outside the generally cylindrical member, and extruding the elastomeric strip.

5. A method for making a rocket motor comprises the steps of:
   a. providing a geneally cylindrical case having a rotational axis;
   b. rotating the case about its rotational axis;
   c. providing within the case a head for applying a continuous strip of tacky elastomeric material to the inner surface of the case as it rotates;
   d. transporting a continuous strip of tacky elastomeric material to the head for application to the inner surface of the case as it rotates;
   e. applying the strip of tacky elastomer material to the inner surface of the case as it rotates;
   f. moving the head axially as the strip is applied to provide a layer of elastomeric material over the inner surface of the case;
   g. removing the head from within the case;
   h. curing the applied elastomeric material to provide an insulator; and
   i. providing propellant material within the case,
   the method further comprises providing an elevated platform which extends axially through the case, providing a support member for the head, moving the support member axially along said platform, and conveying the elastomeric strip to said head from outside the case.

6. A method according to claim 5 further comprises cantileverly supporting the head within the case.

7. A method according to claim 5 further comprises extruding the elastomeric strip.

8. A method for making a rocket motor comprises the steps of:
   a. providing a generally cylindrical case having a rotational axis;
   b. rotating the case about its rotational axis;
   c. providing within the case a head for applying a continuous strip of tacky elastomeric material to the inner surface of the case as it rotates;
   d. transporting a continuous strip of tacky elastomeric material to the head for application to the inner surface of the case as it rotates;
   e. applying the strip of tacky elastomeric material to the inner surface of the case as it rotates;
   f. moving the head axially as the strip is applied to provide a layer of elastomeric material over the inner surface of the case;
   g. removing the head from within the case;
   h. curing the applied elastomeric material to provide an insulator; and
   i. providing propellant material within the case,
   the method further comprises providing an elevated platform which extends axially through the case, providing a support member for the head, moving the support member axially along said platform, conveying the elastomeric strip to said head from outside the case, and rotating the head support member about a vertical axis to position the head for applying the elastomeric strip to a domed portion of the case.

* * * * *